(12) United States Patent
Hatchett et al.

(10) Patent No.: US 7,729,083 B2
(45) Date of Patent: *Jun. 1, 2010

(54) HERMETICALLY SEALED HEAD DISK ASSEMBLY

(75) Inventors: Michael R. Hatchett, Surprise, AZ (US); Kirk Price, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 744 days.

This patent is subject to a terminal disclaimer.

(21) Appl. No.: 11/351,440

(22) Filed: Feb. 9, 2006

(65) Prior Publication Data

US 2007/0183085 A1    Aug. 9, 2007

(51) Int. Cl.
G11B 33/14    (2006.01)
G11B 25/04    (2006.01)

(52) U.S. Cl. .................................. 360/97.02
(58) Field of Classification Search .............. 360/97.01, 360/97.02, 97.03, 98.01
See application file for complete search history.

(56) References Cited

U.S. PATENT DOCUMENTS

| | | | |
|---|---|---|---|
| 4,367,503 A | 1/1983 | Treseder | |
| 5,187,621 A | 2/1993 | Tacklind | |
| 5,223,996 A | 6/1993 | Read et al. | |
| 5,434,748 A | 7/1995 | Fukui et al. | |
| 5,454,157 A | 10/1995 | Ananth et al. | |
| 5,696,648 A * | 12/1997 | Jeong et al. | 360/97.02 |
| 6,392,838 B1 | 5/2002 | Hearn et al. | |
| 6,525,899 B2 | 2/2003 | Hearn et al. | |
| 6,556,372 B2 | 4/2003 | Hearn et al. | |
| 6,762,909 B2 | 7/2004 | Albrecht et al. | |
| 6,821,032 B2 | 11/2004 | Lake et al. | |
| 7,016,145 B2 | 3/2006 | Gunderson et al. | |
| 7,019,942 B2 | 3/2006 | Gunderson et al. | |
| 7,123,440 B2 | 10/2006 | Albrecht et al. | |
| 7,355,811 B1 | 4/2008 | Gifford et al. | |
| 7,359,144 B2 | 4/2008 | Xu et al. | |
| 7,362,541 B2 | 4/2008 | Bernett et al. | |
| 2002/0044375 A1 | 4/2002 | Hirasaka et al. | |
| 2002/0089782 A1 | 7/2002 | Hearn et al. | |
| 2002/0114104 A1 | 8/2002 | Hearn et al. | |
| 2003/0081349 A1 | 5/2003 | Bernett | |

(Continued)

FOREIGN PATENT DOCUMENTS

JP    5062446    3/1993

(Continued)

*Primary Examiner*—Craig A. Renner (57) ABSTRACT

A sealed head disk assembly having a base casting that provides attachment points for major components of the head disk assembly and a cover for enclosing major components of the head disk assembly. The base casting has a hermetic seal encompassed by an outer perimeter of the base casting. The hermetic seal is juxtaposed to at least one complementary surface on the cover. The cover has a semi-hermetic seal inside a perimeter of the complementary surface for the hermetic seal. The semi-hermetic seal is juxtaposed to at least one complementary surface on the base casting. The sealed head disk assembly includes a screw causing deflection in a zone of the cover and provides spring force allowing registering the hermetic seal against a complementary surface of the hermetic seal on the base casting and the semi-hermetic seal against the complementary surface of the semi-hermetic seal on the base casting.

8 Claims, 6 Drawing Sheets

U.S. PATENT DOCUMENTS

| | | |
|---|---|---|
| 2003/0179489 A1 | 9/2003 | Bernett et al. |
| 2003/0223148 A1 | 12/2003 | Macleod et al. |
| 2004/0021980 A1 | 2/2004 | Albrecht et al. |
| 2004/0252407 A1 | 12/2004 | Gunderson et al. |
| 2005/0173870 A1 | 8/2005 | Gunderson |
| 2005/0225893 A1 | 10/2005 | Nakamura |
| 2007/0183085 A1 | 8/2007 | Hatchett et al. |
| 2007/0183086 A1 | 8/2007 | Hatchett et al. |
| 2007/0183087 A1 | 8/2007 | Hatchett et al. |

FOREIGN PATENT DOCUMENTS

| | | |
|---|---|---|
| JP | 8161881 | 6/1996 |

* cited by examiner

HERMETICALLY SEALED HEAD DISK ASSEMBLY

RELATED APPLICATIONS

This application is related to U.S. patent application Ser. No. 10/673,593, entitled "HERMETICALLY SEALED ELECTRONICS ARRANGEMENT AND APPROACH", by David Albrecht, et al, filed Sep. 29, 2003.

This application is related to co-pending U.S. patent application Ser. No. 11/351,782 entitled "HERMETICALLY SEALED HARD DISK ASSEMBLY AND METHOD OF SEALING WITH SOLDERING MATERIAL" by Michael Hatchet, et al, filed Feb. 9, 2006 assigned to the assignee of the present invention.

This application is related to co-pending U.S. patent application Ser. No. 11/352,086 entitled "HERMETICALLY SEALED HARD DISK ASSEMBLY AND METHOD OF SEALING WITH SOLDERING MATERIAL" by Michael Hatchet, et al, filed Feb. 9, 2006 assigned to the assignee of the present invention.

This application is related to co-pending U.S. patent application Ser. No. 11/352,101 entitled "HERMETICALLY SEALED HARD DISK ASSEMBLY AND METHOD OF SEALING WITH SOLDERING MATERIAL" by Michael Hatchet, et al, filed Feb. 9, 2006 assigned to the assignee of the present invention.

TECHNICAL FIELD

This invention relates generally to the field of direct access storage devices and in particular to a sealed head disk assembly and a method of achieving a semi-hermetic and a hermetic seal through a novel design of existing components.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Head Disk Assembly (HDA) has undergone many changes.

Figure 1A:
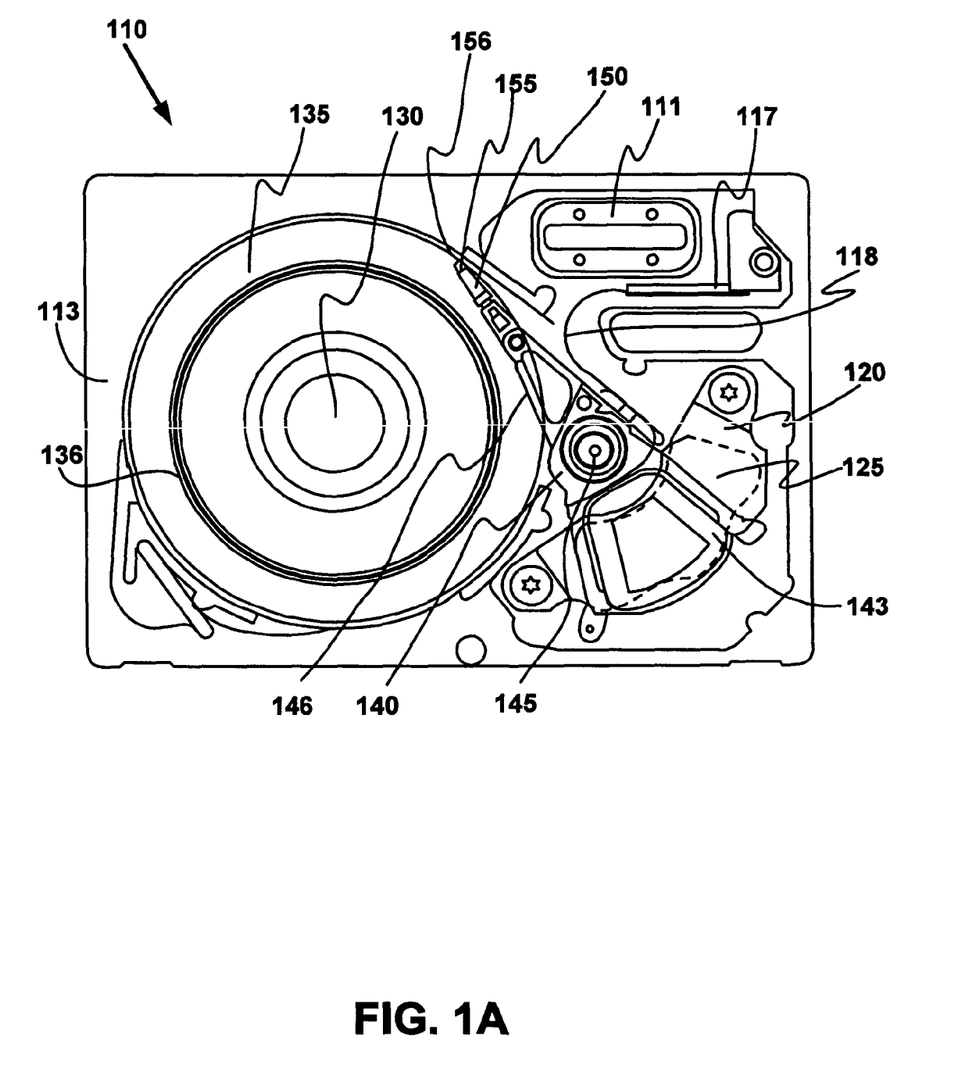
FIG. 1A is a plan view of an HDA with cover and top magnet removed.

Shown in FIG. 1A is the relationship of components and sub-assemblies of HDA 110 and a representation of data tracks 136 recorded on disk surface 135. The cover is removed and not shown so that the inside of HDA 110 is visible. The components are assembled into base casting 113, which provides attachment and registration points for components and sub-assemblies. Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of number of head-disk combinations. Slider 155 and consequently head 156 are incorporated into head gimbal assembly (HGA) 150. HGA 150 is incorporated into actuator 140, which is comprised of at least one arm 146, pivot bearing 145, and voice coil 143. Arm 146 supports HGA 150 over disk surface 135. Pivot bearing 145 allows for smooth and precise rotation of actuator 140. Actuator 140 precisely moves HGA 150 over disk surface 135 by means of electromotive force (emf) produced between voice coil 143 and magnets 125. Emf is a force that is produced when a current is passed through voice coil 143 and is in close proximity to magnets 125. Only bottom magnet 125 is shown. Top and bottom magnets 125 are joined as pole piece assembly 120. Pole piece assembly 120 in conjunction with voice coil 143 constitutes a voice coil motor (VCM). The VCM positions head 156 via actuator 140 by producing a controlled emf. Current is passed through voice coil 143 from controller 117. The required amount of current from controller 117, to produce the desired amount of emf, is determined by location information (stored in other electronic components not shown in FIG. 1A) for data tracks 136 and location information stored in data tracks 136. Electronic commands for accessing data tracks 136 pass from controller 117 through flex cable 118 and into voice coil 143. Small corrections to the position of head 156 are determined from retrieved information from data tracks 136. This retrieved information is sent back to controller 117 so that small corrections can be made to the location and the appropriate current can be sent from controller 117 to voice coil 143. Once the desired data track is located, data is either retrieved or manipulated by means of electronic signals that pass through connector 111 and through flex cable 118. Connector 111 is the electronic interface that allows data to be transferred in and out of HDA 110.

The dynamic performance of HDA 110 is a major mechanical factor for achieving higher data capacity as well as for manipulating this data faster. The dynamic performance of HDA 110 is dependent upon the dynamic performance of its individual components and sub-assemblies. Many factors that influence the dynamic performance are intrinsic to the individual components. Some of these intrinsic factors are in general: mass of the component; stiffness of the component; and geometry of the component. This is not an all-inclusive list and those schooled in engineering or HDA technology will understand that there are many other factors that influence dynamic performance of HDA 110 components and sub-assemblies.

The quantity of data tracks 136 recorded on disk surface 135 is determined partly by how well magnetic head 156 can be positioned and made stable over a desired data track 136. The quantity of data track 136 is a direct indicator of the amount of data stored. Although the mass, stiffness and geometry of the components in actuator 140 directly affect the stable positioning of magnetic head 156, vibration energy that acts on actuator 140 and its components is also a major factor in the stable positioning of head 156. If excessive, vibration energy will impart oscillating motion to actuator 140 and move head 156 from a desired position over data track 136.

There are several sources for vibration energy that act on actuator 140. There is outside vibration energy that enters HDA 110 through base casting 113 and affects the stability of actuator 140. There is internal vibration energy that is produced by rotating components and sub-assemblies inside HDA 110. Motor-hub assembly 130 can transmit vibration energy through base casting 113 and into actuator 140. Spinning disk surface 135 can impart oscillating motion directly into magnetic head 156 and cause it to move off data track 136. And pivot bearing 145 can also transmit vibration energy into actuator 140 and thus into magnetic head 156. Attention is given to all potential sources of vibration energy in the design of these sub-assemblies and components. Another source of vibration energy inside HDA 110 is the motion of the atmosphere inside HDA 110 and its interaction with sub-assemblies and components.

Figure 1B:
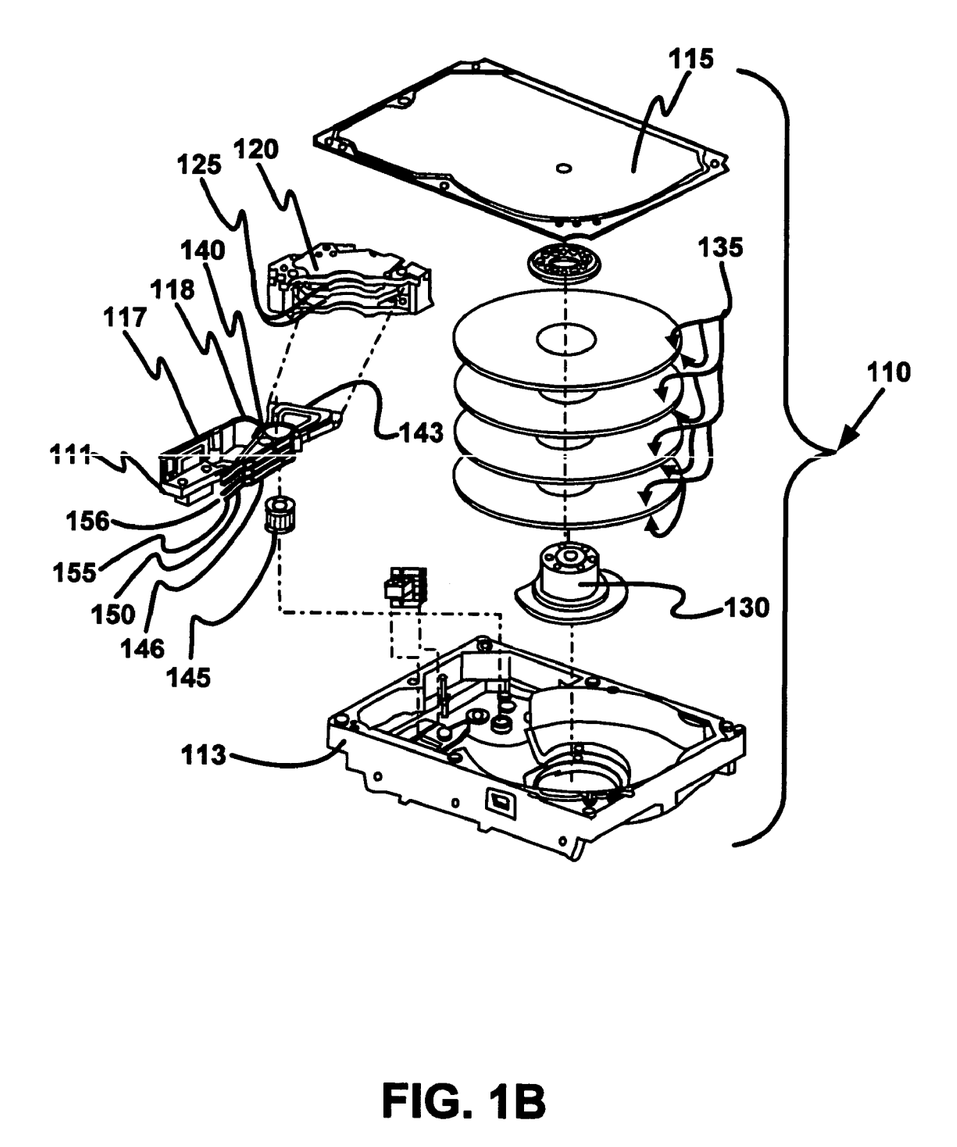
FIG. 1B is an isometric blow-apart of an HDA.

Shown in FIG. 1B is the relationship of components and sub-assemblies during assembly of HDA 110 as described by FIG. 1A. Included in FIG. 1B are cover 115 and both magnets 125.

It has been recognized by HDA designers that it is desirable to control the atmosphere inside the HDA. The atmosphere can be controlled for its humidity as cited in U.S. Pat. No. 6,762,909 or the atmosphere can be controlled for its gas composition. In light of the aforementioned problem of atmosphere inside the HDA impacting HDA components and imparting vibration energy, it has been recognized that a low-density gas, such as helium (He), has the benefit of imparting less energy into HDA components. It is well known that the aerodynamic forces on an object are proportional to the product of the density and square of the velocity of the impinging fluid. By virtue of the lower density of He, it will impart smaller lift and drag forces into HDA components as the internal gas of the HDA impinges on the internal components of the HDA.

Once a desired atmosphere or mixture of gases is introduced inside an HDA, it must be contained or maintained. US Patent Application 2003/0081349 teaches how to replenish the mixture of gases from a reservoir and valve system if the mixture of gases cannot be contained. Emphasis has been placed on containing a mixture of gases once it has been established. The general term for containing and sealing in a gas or atmosphere is a hermetic seal. Partial containment is a semi-hermetic seal. Hermetic seals have taken several forms. Much attention has been given to sealing HDAs by various means of welding. In general, welding is the assembly technique by which two parts to be joined are held together, their mating surfaces heated above their melting temperatures either by applying molten material of similar composition or applying heat directly to the mating surfaces. U.S. Pat. No. 6,762,909 cites welding as a method to achieve a hermetic seal. The high temperatures required for welding has made this approach difficult to apply to the hermetic sealing of an HDA. Other approaches for making a welded hermetic seal are taught in US Patent Application 2003/0223148 and Japanese Patent JP8161881. 2003/0223148 cites laser welding as a means to achieve a welded hermetic seal. Japanese Patent JP8161881 teaches the use of a welded metallic ribbon.

Hermetic seals have also been described that use the folding, or hemming of metal in conjunction with a compliant sealing material. Hemming is the process by which thin sheets are placed together so they overlap at an edge and are secured to each other by folding the overlapping edges together. Both U.S. Pat. Nos. 4,367,503 and 6,556,372 teach variations for hemming metal with a compliant material in the hem.

Secondary enclosures and covers have also been described in the art. US Patent Application 2003/0179489 teaches the use of a structural cover that provides a semi-hermetic seal, followed by a sealing cover that attaches to the base casting and on top of the structural cover that provides the hermetic seal. Japanese Patent JP5062446 teaches placing a generally conventional HDA inside a hermetically sealed outer container.

The challenges to the above cited art include but are not limited to: distortion of HDA components and sub-assemblies due to the high temperature required for welding; restriction of the choice of materials for the base and cover so as to be suitable for welding; the use of multiple components for isolating HDA components and sub-assemblies from welding temperatures; rework procedures that might be required due to failed HDA components or sub-assemblies.

SUMMARY OF THE INVENTION

Various embodiments of the present invention are described herein. A sealed head disk assembly has a base casting that provides attachment points for the major components of the head disk assembly and a cover for enclosing the major components of the head disk assembly. The base casting has a hermetic seal encompassed by an outer perimeter of the base casting. The hermetic seal is juxtaposed to at least one complementary surface on the cover. The cover has a semi-hermetic seal inside a perimeter of the complementary surface for the hermetic seal. The semi-hermetic seal is juxtaposed to at least one complementary surface on the base casting. The sealed head disk assembly also includes a screw that causes deflection in a zone of the cover and provides spring force that allows registering the hermetic seal against a complementary surface of the hermetic seal on the base casting and the semi-hermetic seal against the complementary surface of the semi-hermetic seal on the base casting.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

It is the goal of the embodied invention to address the challenges presented by the cited prior art while achieving flexibility in the assembly and test process, minimizing the number of required components, and minimizing the cost impact associated with producing a hermetically sealed HDA.

Figure 2:
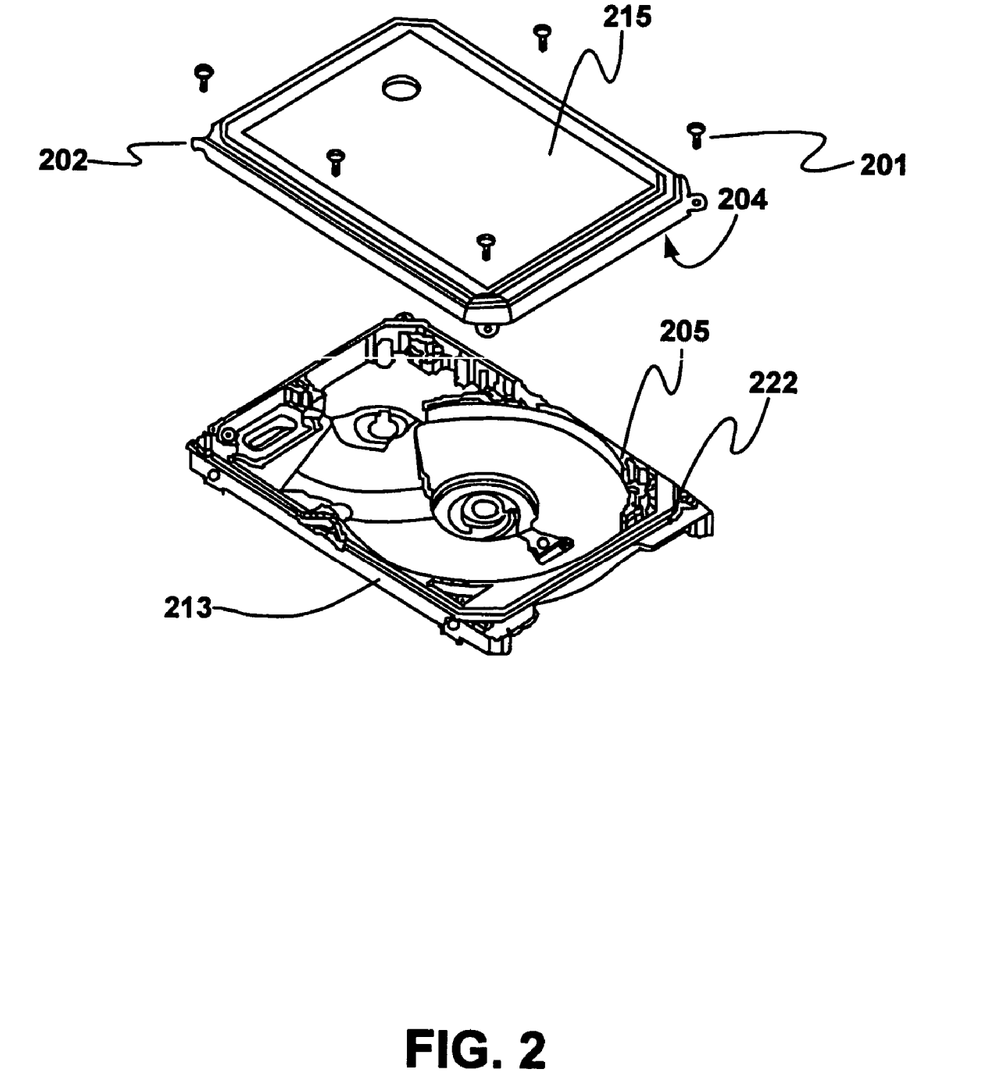
FIG. 2 is an isometric blow-apart of the cover and base casting embodied in the present invention.

The embodied invention teaches a component design and assembly technique by which a semi-hermetic and hermetic seal are in series with each other. A semi-hermetic seal in series with a hermetic seal allows the build and test of the HDA to occur under a desired atmosphere using the temporary semi-hermetic seal. Atmosphere is defined as a mixture of gases, a particular gas, or gases that are typically found in air. Once the HDA has finished its build and test processes, the hermetic seal is activated and the desired atmosphere is permanently sealed inside the HDA. Referring to FIG. 2, cover 215 is similar to the current art of sealing HDA 110. Semi-hermetic seal (not visible in FIG. 2) is attached to an outer perimeter of the inside surface 204 of cover 215. The semi-hermetic seal is juxtaposed to surface 205 on base casting 213. The material for semi-hermetic seal is an elastomeric polymer.

Figure 4:
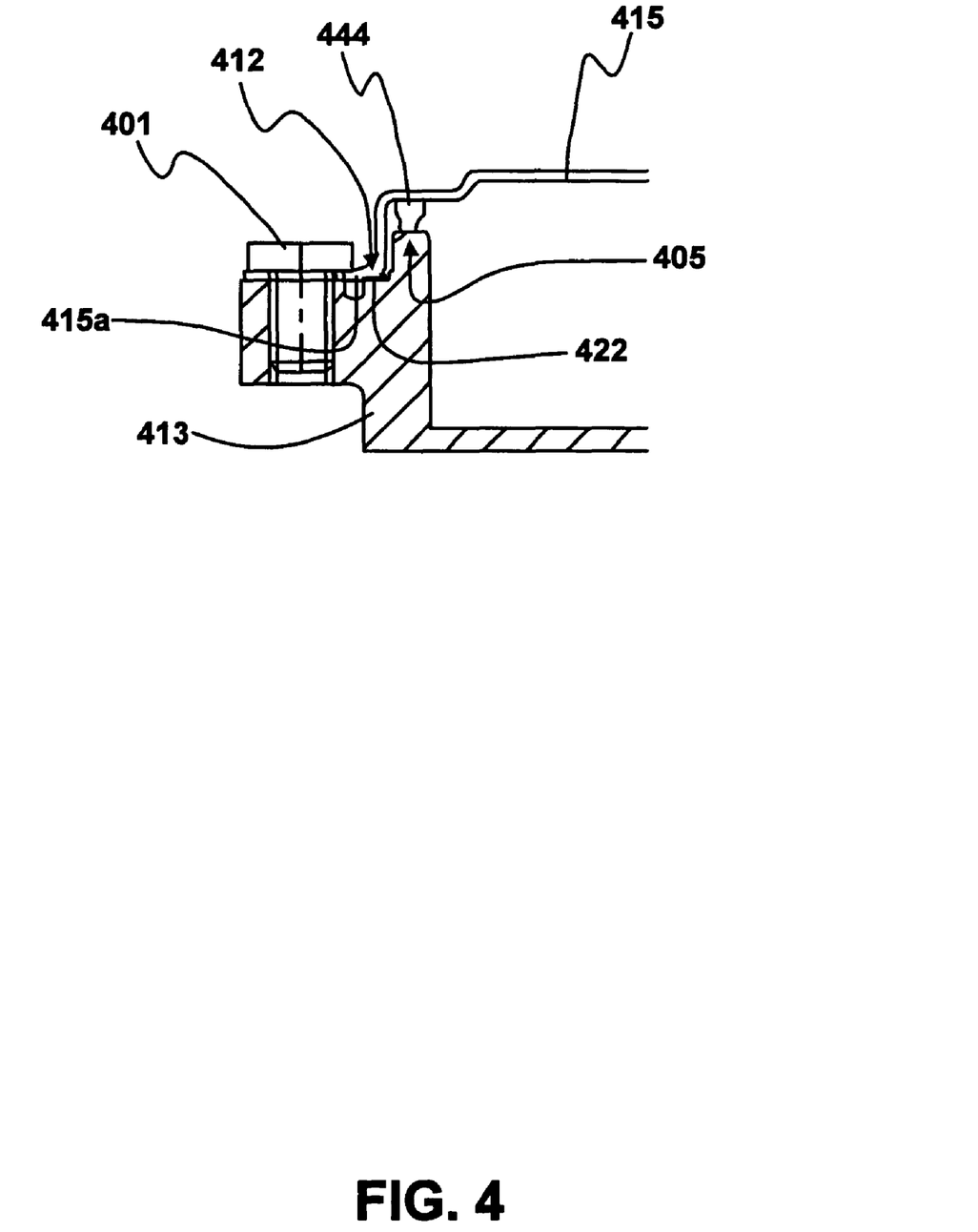
FIG. 4 is a cross-section view through the base casting, cover and a screw embodied in the present invention.

FIG. 4 shows semi-hermetic seal 444 registered against surface 405 of base casting 413. Hermetic seal 422 is aligned and registered against surface 412. Semi-hermetic seal 444 is aligned and registered to surface 405. Multiples of screw 201 and multiples of coinciding screw hole 202 fabricated in cover 215 align and register hermetic seal 422 and semi-hermetic seal 444 against at least one complementary surface in base casting 413. Screw hole 202 fabricated in cover 215 is unsupported on at least one edge. It can be seen in FIG. 4 that screw 401 causes deflection in zone 415a of cover 415 and thus provides spring force that allows registering hermetic seal 422 against complementary surface 412 and semi-hermetic seal 444 against complementary surface 405 in both surfaces on base casting 413.

A major challenge of the cited prior art is the extreme heat required to weld a cover and base casting together to produce a hermetic seal. The invention presented accomplishes a hermetic seal by two methods.

The first method for achieving a hermetic seal is to use a joining technique known in the industry as soldering. Soldering involves the melting of a tertiary material to join two materials. The soldering material typically melts at a temperature below the melting point of the materials to be joined. A hermetic seal using soldering will produce an inviolable atmosphere within the HDA once melting has activated the soldering material.

It is possible that the two materials are of a different composition. If one or both surfaces to be joined are incompatible with the soldering material, a coating is applied which makes the surfaces complementary to the soldering material. The preferred method taught in this invention is to use a solder alloy as the soldering material. The common element in solder alloy is the presence of tin (Sn). Solder alloys include, but are not limited to Sn—Pb, Sn—Ag, Sn—Ag—Cu, and Sn—Bi. If required, the surfaces of the cover and base casting are made complementary to solder alloy via plating or vacuum deposition processes well known in the industry.

This invention is not limited to solder as a soldering material. One schooled in the art will recognize there are numerous methods of soldering with various metals, alloys, and plastics. FIG. 2 depicts one embodiment by which soldering material 222 is applied around a perimeter of base casting 213. It is to be understood that the application of soldering material 222 can be accomplished by a variety of techniques that include but are not limited to plating, vacuum processing, solder paste, placing a preform of soldering material 222 on complementary surface 412, dipping complementary surface 412 into molten soldering material.

The second method for achieving a hermetic seal is to use an appropriate liquid bonding material. In general an appropriate liquid bonding material is a reactive cross-linking polymer. A common type of reactive cross-linking polymer is epoxy, but for the purpose of this invention, a reactive cross-linking polymer also includes adhesives that react and are solidified in the presence of heat or a catalyst that causes the cross-linking process to take place.

Activation of hermetic seal 222 is dependent upon the material from which hermetic seal 222 is made. The embodied invention is independent of the method of activating hermetic seal 222. Some common examples of activation by heat are: laser heating, hot iron, inductive heating, oven, and infrared radiation. Other examples of activation are applying a chemical to make a surface complementary for activation with hermetic seal 222. A chemical used in this manner is typically known as a primer.

Figure 3:
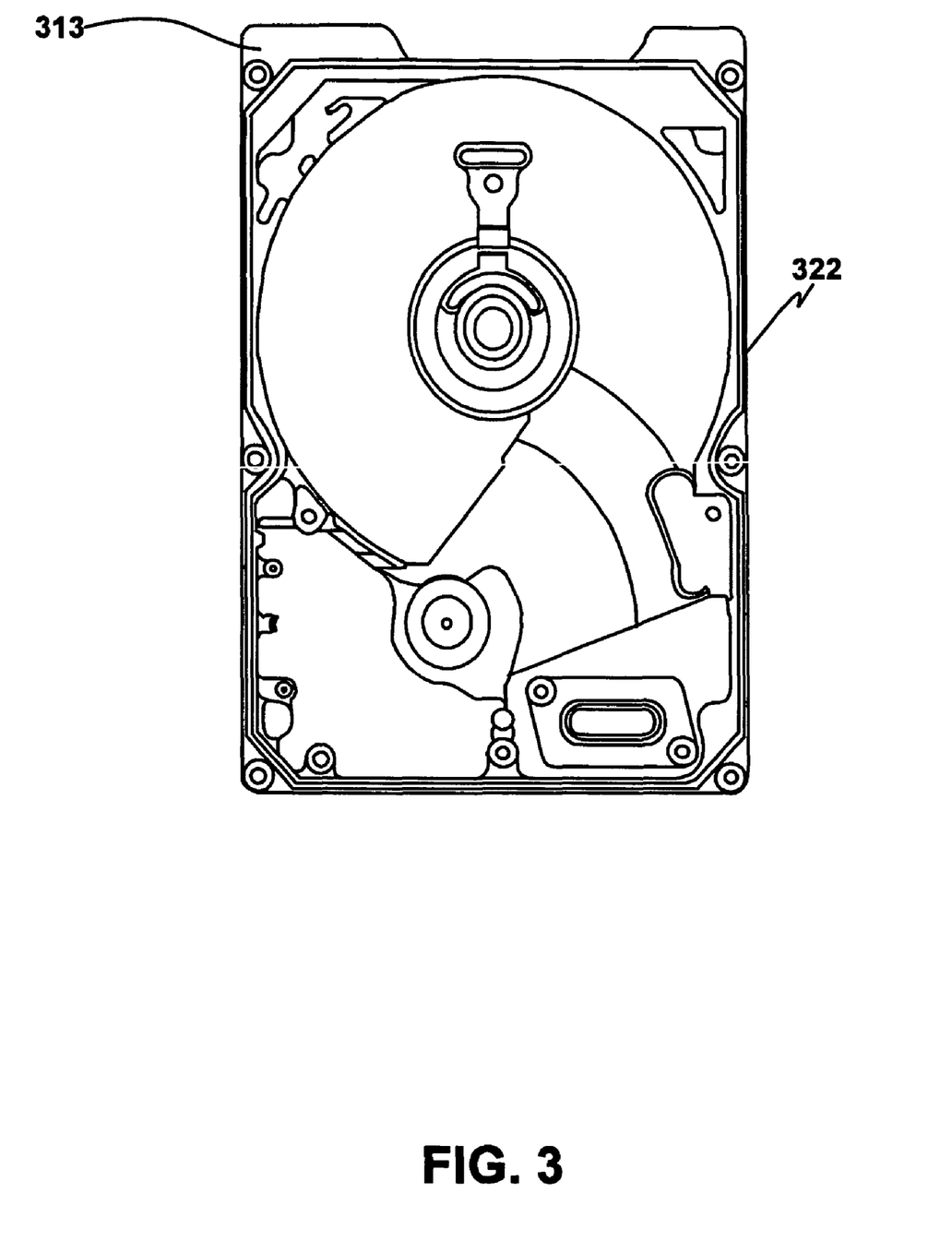
FIG. 3 is a plan view of the base casting embodied in the present invention.

FIG. 3 shows hermetic seal 322 positioned around an outer perimeter of base casting 313. It is to be understood that a semi-hermetic seal in series with a hermetic seal can be designed in a variety of combinations. Examples, and the embodied invention not being limited to these examples, are: both hermetic seal and semi-hermetic seal integral to cover; both hermetic seal and semi-hermetic seal integral to base casting; hermetic seal integral to base casting and semi-hermetic seal integral to cover; hermetic seal integral to cover and semi-hermetic seal integral to base casting.

In conjunction with providing a hermetic seal between base casting 113 and cover 115, a hermetic seal must also be provided between base casting 113 and connector 111 and base casting 113 and motor-hub assembly 130. The sealing of these components is taught in other art and is beyond the scope of the embodied invention.

Figure 5:
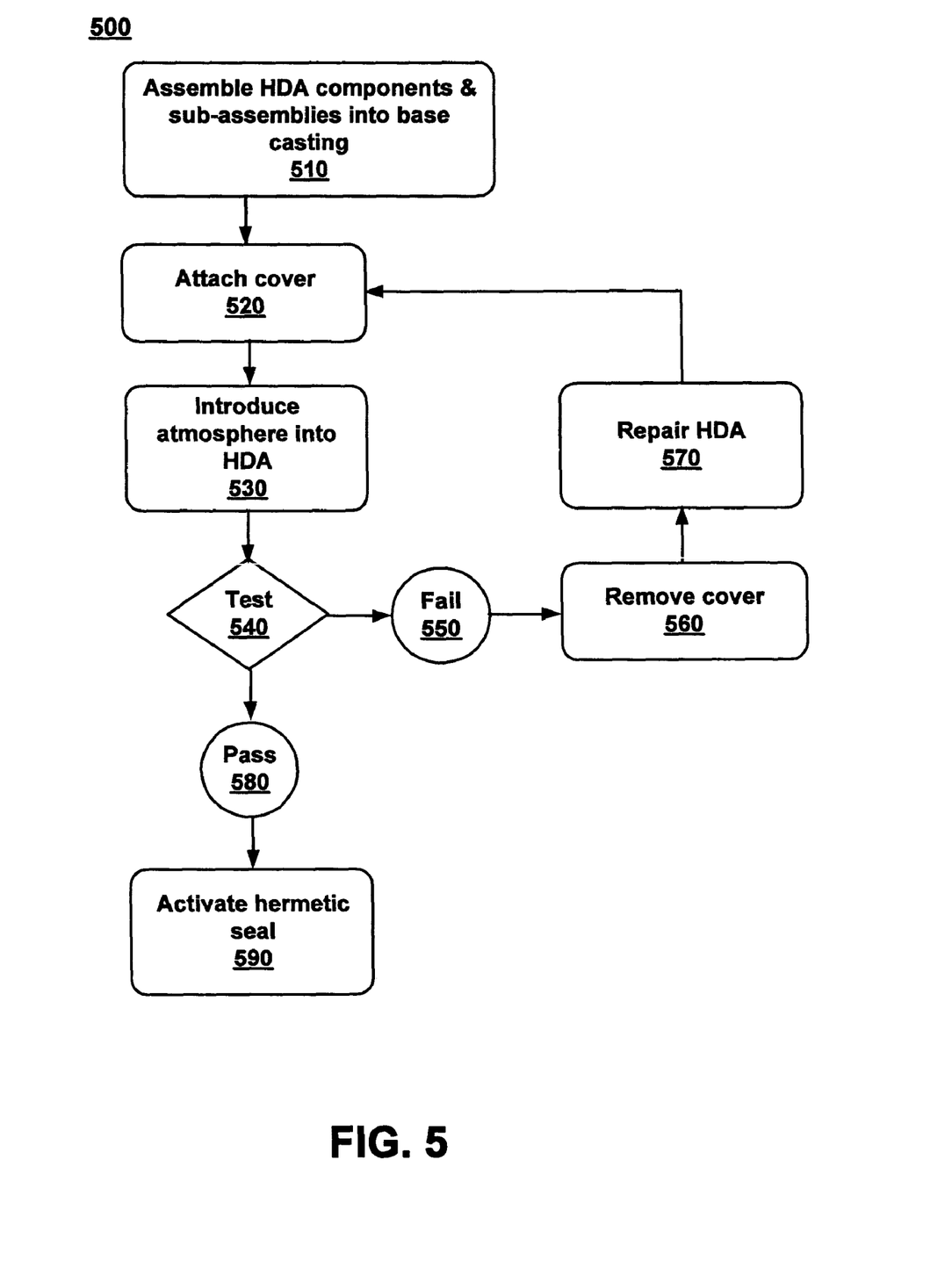
FIG. 5 is a process flow diagram embodied in the present invention.

Independent of hermetic seal 444 being integral to cover 415, or hermetic seal 444 being integral to base casting 413, or semi-hermetic seal 444 being integral to cover 415, or semi-hermetic seal 444 being integral to base casting 413, the assembly process follows the flow chart shown in FIG. 5.

FIG. 5 is a flow chart of a process 500 in which particular steps are performed in accordance with an embodiment of the present invention for hermetically sealing a head disk assembly with a soldering material. FIG. 5 includes processes of the present invention which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 500, such steps are exemplary. That is, the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism and human interaction.

In step 510 of process 500, HDA components and subassemblies of a hard disk drive 110 are assembled in a base casting 113 (as shown in FIGS. 1A and 1B), in an embodiment of the present invention.

In step 520 of process 500, a cover 215 is attached to a base casting 213 (as shown in FIG. 2) in an embodiment of the present invention.

In step 530 of process 500, an atmosphere is introduced into the HDA, in an embodiment of the present invention. One schooled in the art will recognize that there are many various methods and techniques to introduce an atmosphere into an HDA.

In step 540 of process 500, upon introduction of the atmosphere into the HDA, the HDA is tested. One schooled in the art is cognizant that there are many various criteria, methods and techniques that are specified to test the HDA.

In step 580 of process 500, if the HDA passes the specified test, process 500 proceeds to step 590. If the HDA fails the specified test, process 500 proceeds to step 560.

In step 590 of process 500, the hermetic seal is activated in an embodiment of the present invention. In an embodiment, laser heating may activate the hermetic seal. Alternatively, activation of the hermetic seal may be achieved by, but is not limited to, a hot iron, an oven, infrared radiation or application of a chemical or primer, in another embodiment of the present invention.

In step 550, if the HDA fails the specified test, process 500 proceeds to step 560.

In step 560 of process 500, the cover, e.g., cover 115 of FIG. 1B or cover 215 of FIG. 2, is removed from the base casting, e.g., base casting 113 of FIG. 1B or base casting 213, respectively, in an embodiment of the present invention.

In step 570 of process 500, those elements and/or components of the HDA that failed the specified test are repaired accordingly. Once the faulty elements and components are properly repaired, process 500 returns to step 520, in which the cover is again attached to a base casting.

Subsequent to the completion of step 520 of process 500, process 500 returns to step 530, in an embodiment of the present invention.

Advantageously, the present invention, in the various presented embodiments allows for the hermetic sealing of an HDA without precluding reworking the HDA in the event of failure during testing. The present invention in the various presented embodiments advantageously allows for cost effective hermetic sealing of an HDA through the novel design of components that are similar to the current art and by not adding more components to the HDA.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A sealed head disk assembly comprising:

a base casting for providing attachment points for major components of said head disk assembly, said base casting comprising a hermetic seal encompassed by an outer perimeter of said base casting thus allowing said hermetic seal to be juxtaposed to at least one complementary surface on a cover; said cover for enclosing said major components of said head disk assembly, said cover comprising a semi-hermetic seal inside a perimeter of said complementary surface for said hermetic seal thus allowing said semi-hermetic seal to be juxtaposed to at least one complementary surface on said base casting;

a screw coupled with said cover and configured such that when turned causes deflection in a zone of said cover that provides said hermetic seal against said complementary surface on said cover and said semi-hermetic seal against said complementary surface on said base casting; and screws outside a perimeter of said hermetic seal that join said cover to said base casting.

2. The sealed head disk assembly of claim 1 wherein said semi-hermetic seal allows for removal of said cover at various stages of assembly and test.

3. The sealed head disk assembly of claim 1 wherein said hermetic seal once activated effects an inviolable atmosphere within said head disk assembly after assembly and test operations have been concluded.

4. The sealed head disk assembly of claim 1 wherein said semi-hermetic seal is elastomeric polymer.

5. The sealed head disk assembly of claim 1 wherein said hermetic seal is soldering material.

6. The sealed head disk assembly of claim 1 wherein said hermetic seal is formed from a preform of soldering material.

7. The sealed head disk assembly of claim 1 wherein said hermetic seal is formed from solder paste.

8. The sealed head disk assembly of claim 1 wherein said hermetic seal is reactive cross-linking polymer.

* * * * *